United States Patent [19]
George et al.

[11] 3,840,403
[45] Oct. 8, 1974

[54] CONSTRUCTION AND OPERATION OF RECHARGEABLE BATTERY SYSTEMS FOR CHEMICALLY GENERATING AN ELECTRICAL CURRENT

[76] Inventors: James H. B. George, 31 Linnaean St., Cambridge, Mass. 02138; Albert E. Dennard, 31 Stanstead Manor, Cheam Rd., Sutton, Surrey, England; Ekkehard L. Kreidl, 20 Bennett Rd., Wayland, Mass. 01778

[22] Filed: Aug. 19, 1971

[21] Appl. No.: 173,016

Related U.S. Application Data

[63] Continuation-in-part of Ser. Nos. 606,418, Dec. 30, 1966, Pat. No. 3,470,024, and Ser. No. 606,419, Dec. 30, 1966, Pat. No. 3,464,860, and Ser. No. 726,000, May 2, 1968, abandoned, and Ser. No. 866,633, Oct. 15, 1969, abandoned.

[52] U.S. Cl. .............................. 136/6 GC, 136/179
[51] Int. Cl. ......................................... H01m 35/00
[58] Field of Search .......... 136/6, 179, 16; 252/471, 252/477 R

[56] References Cited
UNITED STATES PATENTS

| | | | |
|---|---|---|---|
| 2,578,027 | 12/1951 | Pichenor | 136/179 |
| 2,615,062 | 10/1952 | Craig | 136/179 |
| 2,687,449 | 8/1954 | Gulick et al. | 136/179 |
| 3,258,360 | 6/1966 | Kordesch | 136/6 |
| 3,311,097 | 3/1967 | Mittelstaedt | 136/179 |
| 3,356,533 | 12/1967 | Carson, Jr. | 136/6 |
| 3,464,860 | 2/1969 | George et al. | 136/179 |
| 3,470,024 | 9/1969 | George et al. | 136/179 |
| 3,630,778 | 12/1971 | Kreial et al. | 136/179 |
| 3,649,699 | 3/1972 | Aoki et al. | 252/441 X |

FOREIGN PATENTS OR APPLICATIONS

| | | | |
|---|---|---|---|
| 339,824 | 12/1930 | Great Britain | 136/179 |

*Primary Examiner*—Winston A. Douglas
*Assistant Examiner*—C. F. Lefevour
*Attorney, Agent, or Firm*—Munroe H. Hamilton

[57] ABSTRACT

Rate of recombination of gases in a battery is controlled in relation to exothermically induced rise in temperature of recombination means. A sealed pressure-controlled battery system with electrolyte and recombination means is placed in operation and periodically recharged in a substantially maintenance-free condition throughout a number of battery charge and discharge cycles with evolution of the gases oxygen and hydrogen in a closed gas space. Oxygen and hydrogen evolve at varying rates and in amounts which are non-stoichiometric in any one charging cycles, but which when produced during a sufficient number of charging cycles in a constantly pressurized environment, will occur in quantities which are long-term stoichiometric. Amounts of oxygen and hydrogen to the extent that they are present in the stoichiometric ratio of 2:1 during any given cycle are recombined in the presence of recombination means with the temperature of the recombination means being controlled within upper limits of from about 400° C. up to about 600° C. Residual fluctuating gases evolved during successive cycles of charge and discharge are confined within predetermined releasable limits in the closed gas space and are held throughout a range of continuous pressure variations in which residual gas representing excess over stoichiometry of one component gas during some periods of operation recombines with residual gas representing excess over stoichiometry of the second component gas during other periods of operation, thereby to preserve the total water content in the battery without significant change.

2 Claims, 16 Drawing Figures

NO. XIV BATTERY — CYCLIC PRESSURE RANGE AND MEDIAN

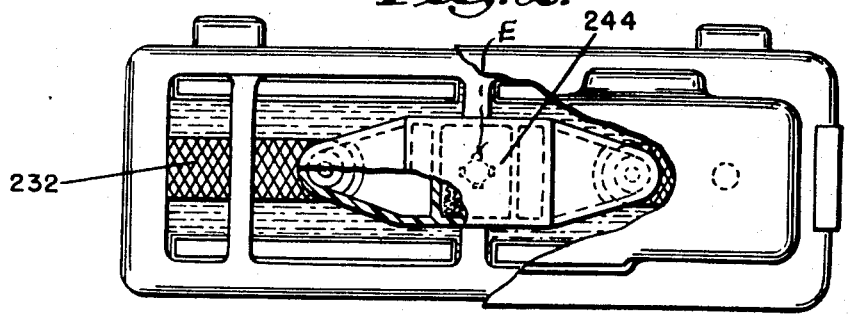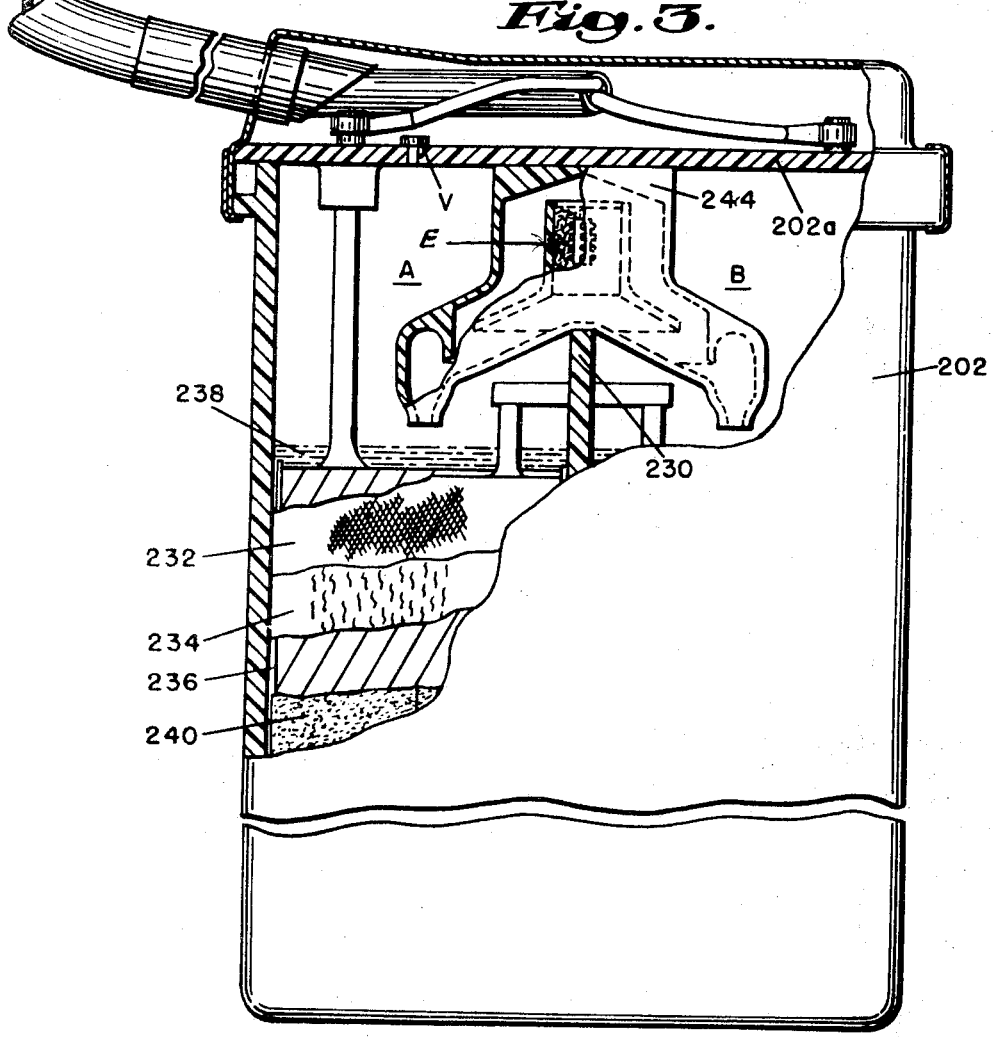

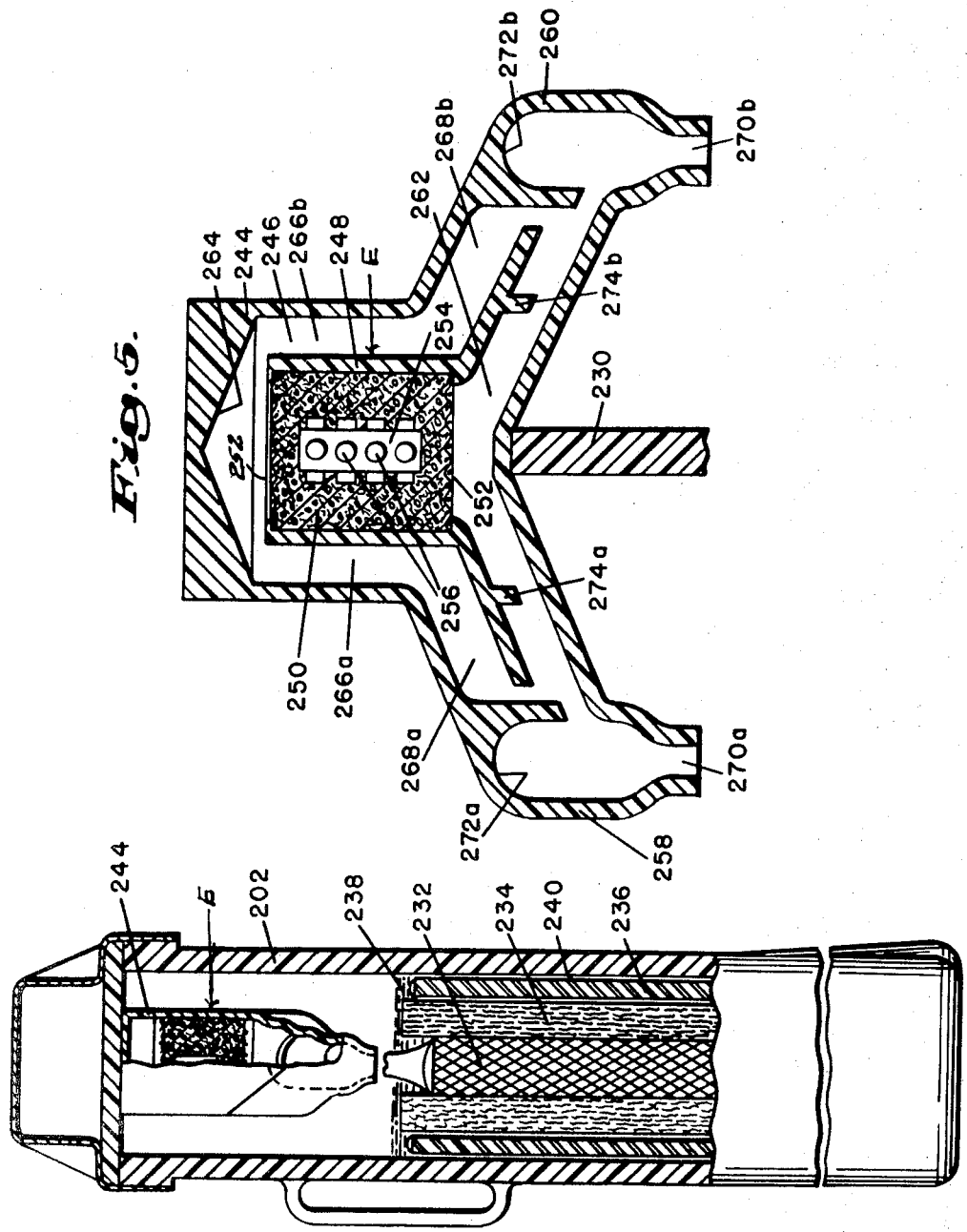

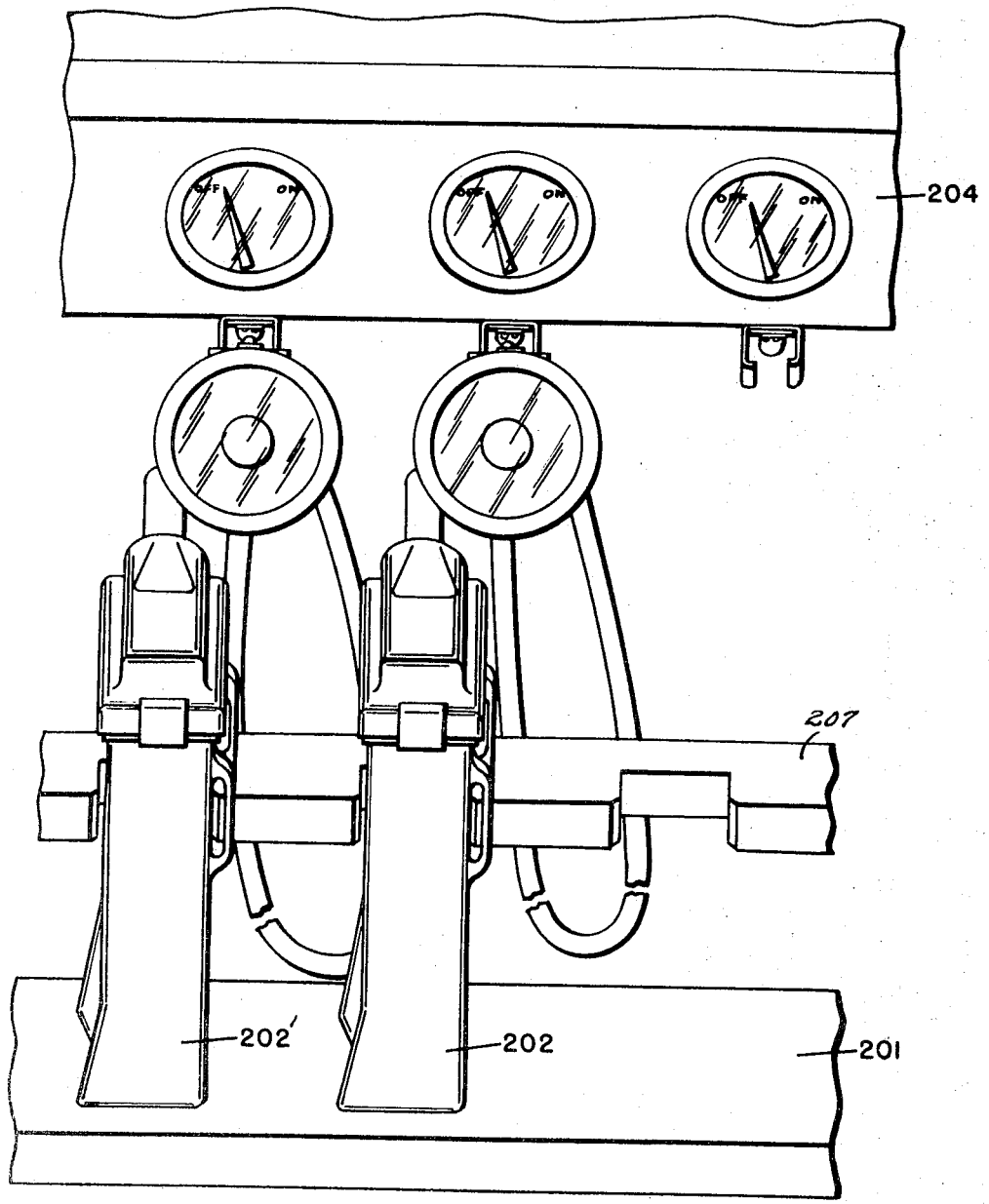

TOTAL VOLUME OF GAS EVOLVED IN A 14 HOUR CHARGE

NO. X BATTERY CYCLIC PRESSURE MEDIAN

Inventors:
James H. B. George,
Albert E. Dennard,
Ekkehard L. Kreidl
by Munroe H. Hamilton
Attorney

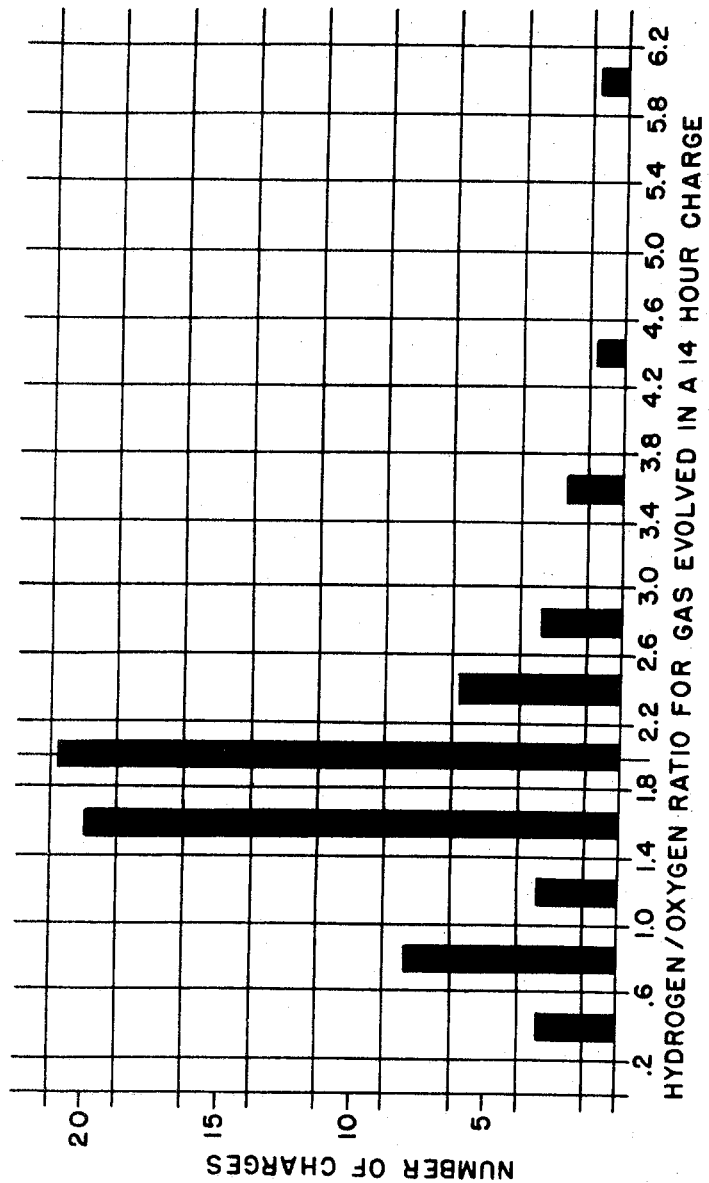

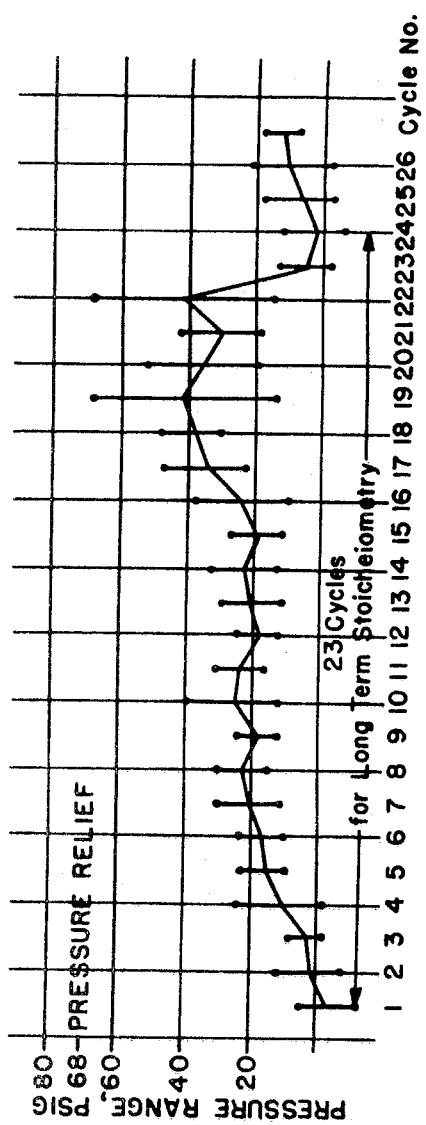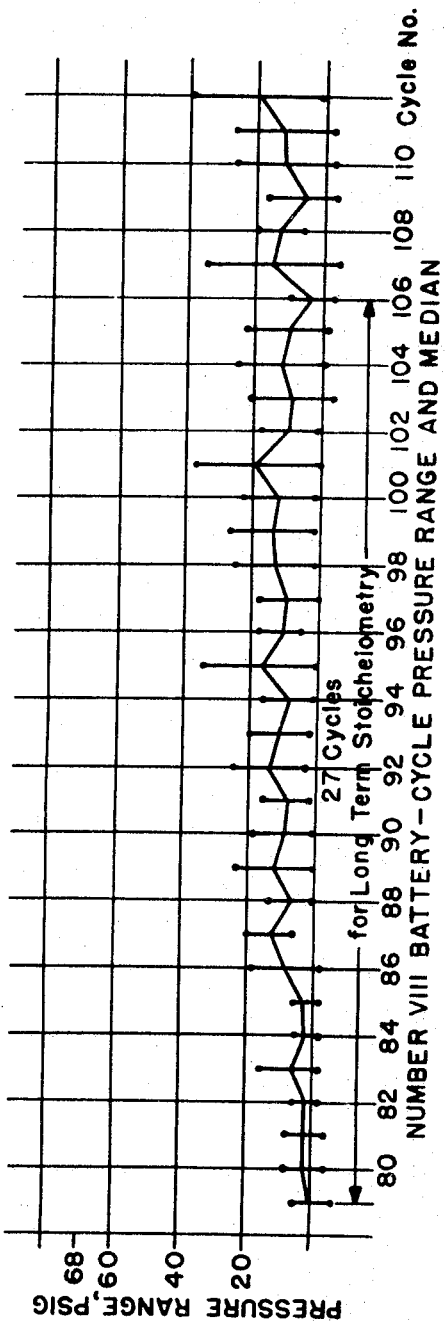

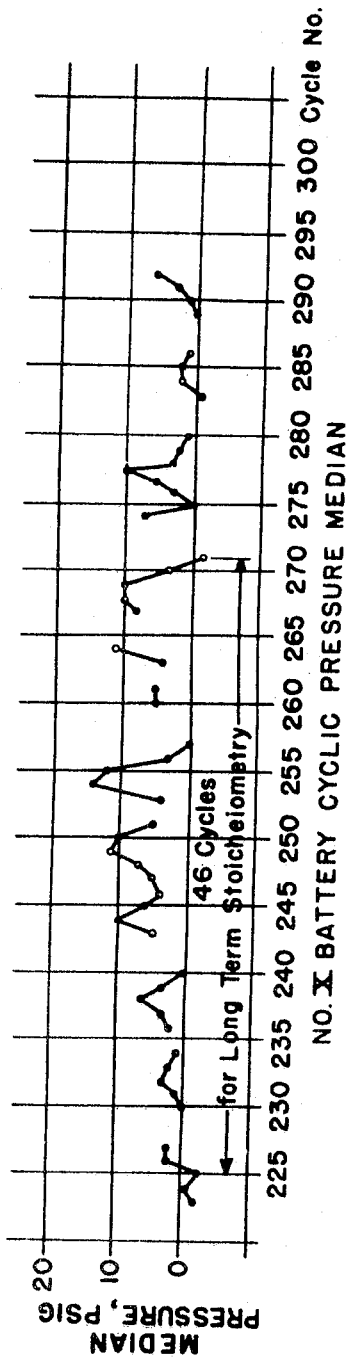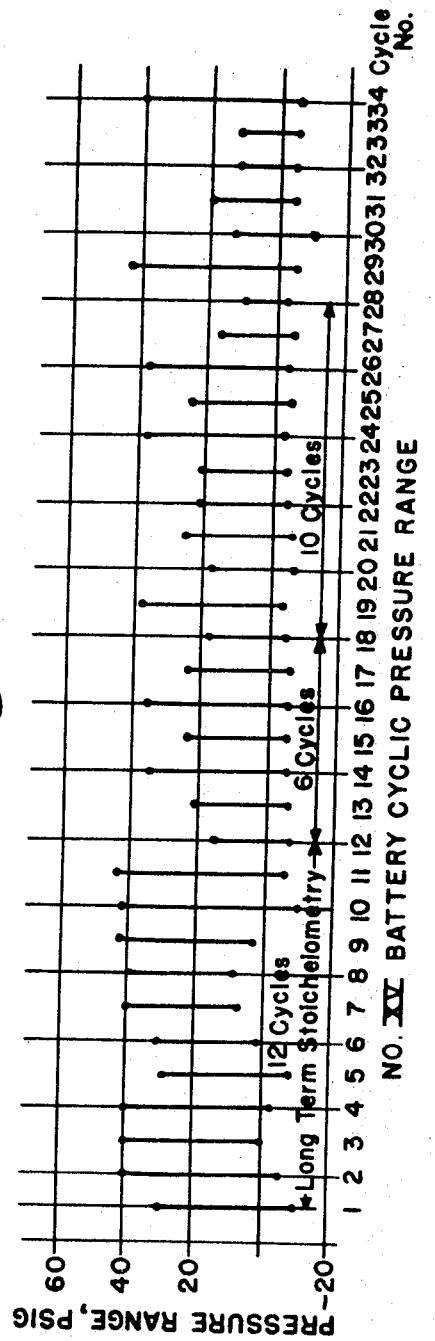

Inventors:
James H.B. George,
Albert E. Denard,
Ekkehard L. Kreidl,
by Munroe N. Hamilton
Attorney

CONSTRUCTION AND OPERATION OF RECHARGEABLE BATTERY SYSTEMS FOR CHEMICALLY GENERATING AN ELECTRICAL CURRENT

This application is a continuation-in-part of Application Ser. No. 606,418 filed Dec. 30, 1966 for Recombination Systems for Sealed Batteries and Batteries Incorporating Them, now issued as U.S. Pat. No. 3,470,024 under date of Sept. 30, 1969, and Application Ser. No. 606,419 filed Dec. 30, 1966 for Recombination Systems for Sealed Secondary Batteries and Batteries Incorporating Them, now issued as U.S. Pat. No. 3,464,860 under date of Sept. 2, 1969, and Application Ser. No. 726,000 filed May 2, 1968 for Construction and Operation of Rechargeable Battery Systems for Chemically Generating an Electrical Current now abandoned, and Application Ser. No. 866,633 filed Oct. 15, 1969 for Construction and Operation of Rechargeable Battery Systems for Chemically Generating An Electrical Current now abandoned.

The present invention relates broadly to improved methods and means for generating electrical current directly by electrochemical action carried out in a sealed enclosure body over extended operating periods, and for periodically reversing the current to carry out recharging. More particularly the invention is concerned with improvements in operating a battery system which includes essentially a sealed storage battery having battery cells for chemically generating current when on discharge. However, the term "battery system" is intended to also refer to and include a battery charging apparatus for reversing current when the battery is required to be recharged at desired intervals.

Storage batteries of the class suitable for recharging ordinarily contain positive and negative members such as battery plates with separators and some form of electrolyte contained in one or more battery cells. The present invention in one preferred embodiment is hereinafter disclosed with reference to lead-acid batteries utilizing the electrolyte sulphuric acid. However, it should be understood that the invention is not limited to lead-acid type batteries and may be embodied in various other types of known battery systems where gassing is experienced such as nickel cadmium, nickel iron and other systems evolving hydrogen and oxygen or other catalytically recombinable gases.

A typical example of lead-acid type battery use where gassing becomes particularly significant, is in supplying current to miners' lamps of the class carried by miners and referred to as "miners' cap lamps." Batteries for miners' lamps, being in daily use for extended periods of time require frequent charging and are oridnarily placed in a charging rack by the miners at the end of a working day and the batteries are recharged overnight. Longer periods of recharging are carried out during weekends and addition of water is required weekly. Since the battery and cap lamp may be carried by the miners into explosive atmospheres, the danger of accidental sparks or combustion of any type must also be carefully guarded against.

A commonly recognized problem in operating a sealed battery of the lead-acid type is the occurrence of gas evolution taking place especially during the recharging of the battery from time to time. The principal gases evolved are oxygen and hydrogen which are given off in varying amounts. Since these gases are evolved in sufficient quantities to exert substantial pressures, they are not readily retained in a sealed battery cell without danger of bursting the battery cell. If the gases are allowed to escape, resultant changes in electrolyte level and concentration may lower the efficiency and life of the battery after a period of time. Addition of water carried out to replace water lost as a result of vented oxygen and hydrogen gases creates a maintenance problem.

It has been proposed in the art to deal with the problem of gassing by recombining hydrogen and oxygen in stoichiometric quantities and a number of devices for accomplishing this have been tried, including various well-known catalytic agents and materials as noted in patents referred to in our U.S. Pat. No. 3,470,024 issued Sept. 30, 1969 and U.S. Pat. No. 3,464,860 issued Sept. 2, 1969.

However, an important factor which also has to be dealt with is the evolution of non-stoichiometric quantities of gases especially during repeated battery charging periods. For example, a large excess of hydrogen or oxygen may be evolved during certain portions of the charging cycle. This may result in a buildup of dangerously high pressures by residual gas which may be an excess of either hydrogen or oxygen notwithstanding the fact that stoichiometric quantities of hydrogen and oxygen are being recombined during these charging periods.

This residual gas pressure buildup problem is further complicated by difficulties which are encountered in using catalytic devices. For example, maintaining a metallic type catalyst with a satisfactory recombination capacity is sometimes a problem. It is found that in prior art devices using metallic catalysts recombination of the gases may occur at a variable rate and if the rate of recombination proceeds at a sufficiently high intensity there tends to result ignition of the gases with explosive tendencies. In other cases, the catalyst may become deactivated by exposure to acid spray or by flooding from excessive water accumulation on the catalyst surfaces.

It is therefore a chief object of the present invention to deal with the problems indicated and to provide improved methods and means for operating and periodically recharging a secondary battery system in a substantially maintenance-free condition throughout a considerable number of battery charge and discharge cycles.

Another object of the invention is to devise a method of operating a sealed secondary battery in which residual gas pressures may be safely contained during an extended life of battery charging and battery discharging cycles.

Another object of the invention is to provide an improved battery construction of the lead-acid type, together with a method of hermetically sealed operation in which gases such as oxygen and hydrogen evolved during recharging may be substantially all confined in a sealed environment and recombined in the presence of a catalytic device to maintain electrolyte level and concentration substantially unchanged and thus eliminate the need for periodic addition of water.

Another object of the invention is to provide a method of recombining hydrogen and oxygen in the presence of a catalyst having predetermined recombining capabilities, and, Still a further specific object is to devise methods and means for controlling the rate of recombination of hydrogen and oxygen within a sealed battery cell so that regardless of relative amounts of gases evolved, risk of explosions in the battery cell or excessive damage to the recombination device or devices may be avoided on a long term basis and deactivation of the catalyst may be prevented.

The nature of the invention and its other objects will be more fully disclosed in connection with a detailed description of the invention as illustrated in the accompanying drawings, in which:

FIG. 2 is a plan view of a battery of the general type indicated in FIG. 1;

FIG. 3 is a side elevational view of the battery with portions broken away to illustrate a catalyst recombining means in the battery;

FIG. 4 is another vertical cross sectional view of the battery shown in FIGS. 2 and 3;

FIG. 5 is a detail cross sectional view of a recombining device with catalyst contained therein;

FIG. 6 is an elevational view illustrating fragmentarily a battery charging apparatus with which a battery may be recharged in accordance with the invention;

FIG. 8 is another diagrammatic view illustrating in chart form further battery gassing data;

FIG. 9 is a diagrammatic view illustrating plotted data of battery gassing occurring in accordance with the method of the invention;

FIG. 10 is another diagrammatic view illustrating plotted gassing data with the method of the invention;

FIGS. 11, 12, 13 and 14 are also diagrammatic views illustrating further gassing characteristics in operating a battery in accordance with the method of the invention;

Figure 1:
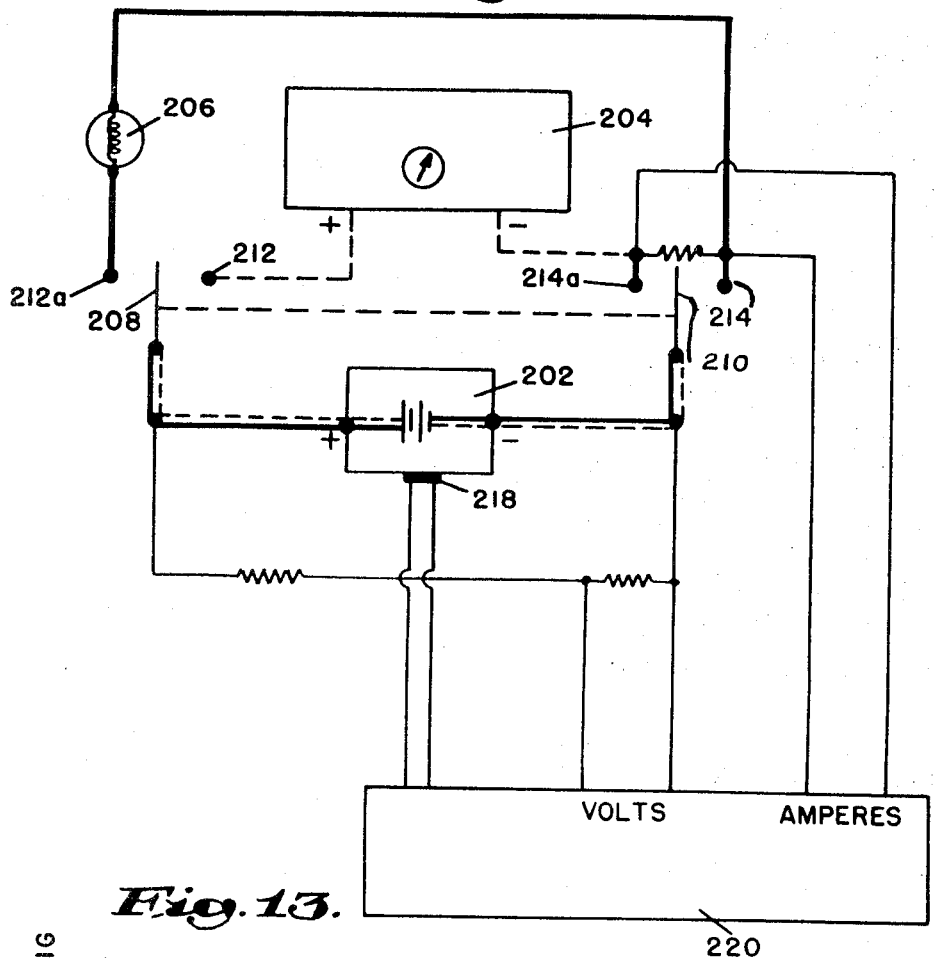
FIG. 1 is a diagrammatic view illustrating a battery system which may be operated and periodically recharged in accordance with the recombination method of the invention.

In accordance with our invention, we have devised a method of containing and resolving gas pressures including residual gas pressures while recombining gases in a sealed secondary battery within safe limits. In carrying out our method, we may employ various types of recombination means including such devices as heating wire means, metallic type catalysts and the like. However, in preferred embodiments of the invention, we may employ metallic-type catalysts.

In some applications of our basic method of containing and resolving gas pressures during battery cycling, we may also further employ a novel method and means for controlling the rate of recombination per unit surface area of gases such as hydrogen and oxygen at the surfaces of the metallic-type catalysts. This controlled rate of recombination technique constitutes a further aspect of the invention and has been devised so that recombination may take place at a specifically limited and safe rate under varying conditions and so that the catalyst surfaces may be protectively maintained against certain deactivation hazards over long operating periods of battery charging and discharging. The basic method of containing and resolving gas pressures will be first described as noted hereinafter to be followed by a detailed disclosure of controlling rate of recombination.

Our improved method of containing and resolving gas pressures is based on a newly discovered gas evolution behavior involving "long-term stoichiometry" under pressure controlled conditions, and this discovery has led to the concept and implementation of a recombination technique which is hereinafter referred to in the application as "long term stoichiometric recombination." The term "stoichiometry" as used herein refers to the 2:1 molecular proportion of hydrogen to oxygen in water.

The newly discovered gas evolution behavior has been determined from observation of the gassing characteristics of oxygen and hydrogen evaluated separately over extended periods of battery discharge and charge cycles under pressure controlled conditions. These observations show that evolution of oxygen and hydrogen is induced at varying rates and in amounts which are most frequently non-stoichiometric in any one charging and discharging cycle but which, when produced during a sufficient number of charging and discharging cycles will occur in quantities which are either long term stoichiometric or which approach very near to this relationship.

Our concept of long term stoichiometric recombination of oxygen and hydrogen is based on an extensive analysis of gassing as it occurred in secondary batteries in a considerable number of discharge and charging cycles in an unsealed condition which indicated that in an open (unsealed) system, deviations from stoichiometry are randomly distributed. We have discovered that pressures resulting from gas evolution occurring on a short term basis may be safely handled in a battery cell construction capable of retaining a pressure of approximately 75 to 80 p.s.i., and we have determined that this pressure level is not inconsistent with practical battery cell construction where the battery is furnished with properly controlled means for recombining gases on a long term stoichiometric basis.

We have further found that uncombined pressure exerting gases from gas evolution occurring on a long term basis over a number of battery discharging and recharging cycles extending over the operating life of a battery may also be safely contained by a battery construction capable of retaining a pressue of 75 to 80 p.s.i. We found that by continually confining uncombined pressure exerting gases evolved during said battery discharging and recharging cycles within a range of pressures of from less than one atmosphere up to five atmospheres, we may progressively react said gases for long term stoichiometric recombination.

We have still further found that we may, by the use of a suitable pressure relief valve means, and by adjusting this valve setting in relation to gas space volume and gassing characteristics of the battery, provide for a safe battery operation which will avoid danger of rupture or failure in other ways.

Finally, we have determined that we may in a method of recombining hydrogen and oxygen with a catalyst in a sealed battery, control the rate of recombination in relation to the exothermically induced rise in temperature of the catalyst so that the catalyst may be protectively contained in a fluctuating pressure environment and may be regulated in its recombining capability in ways which are consistent with the requirements imposed in operating a storage battery over a period of two years or more of daily deep discharge and charge cycles.

In our basic method of resolving gas pressures evolved gases are held throughout a number of battery discharging and charging cycles and amounts of oxygen and hydrogen are recombined in stoichiometric ratio of 2:1 of hydrogen to oxygen during any given cycle. In the presence of a recombination device such as a hot wire or a catalyst contained in the pressurized environment, residual gases evolved during successive cycles of charge and discharge are confined with predetermined releasable limits in a closed gas retaining space. The gases are held throughout a range of continuous pressure variations in which residual gas representing excess over stoichiometry of one component gas during some periods of operation recombines with residual gas representing excess over stoichiometry of the second component gas during other periods of operation thereby to preserve said electrolyte level and concentration without significant change from that of a well maintained open battery with water being added whenever the electrolyte level is lowered over acceptable limits.

In thus operating the secondary battery system, it will be observed that two basic steps are required to be carried out in an alternating manner. During one period the battery must be placed on discharge and in another period the battery must be placed on charge. However, for a number of applications, the battery may also be used in a standby mode.

As noted above a preferred embodiment of the recombination method of the invention will be described in connection with a miners' lamp battery being an example of a battery requiring high reliability, careful maintenance and continuous use. The construction, specific operation and conventional gassing behavior of an unsealed miners' battery are noted below in order to more fully substantiate the premises on which the long term stoichiometric recombination method of the invention is based.

For example, one very common miners' lamp battery has a nominal rating of 4 volts resulting from two cells in series. It has an ampere-hour rating of 12 at a 10 hour discharge rate, one tubular type positive plate and two pasted negative plates per cell, and electrolyte-absorbing separators which, with the plates, contain all but about 20 ml of the 170 ml of the electrolyte in each cell.

A gas space of approximately 75 ml is provided above the plates in each cell, and there is also a constantly open, but baffled or labyrinthine, vent passage from each cell to the atmosphere. Such a battery typically is discharged daily for 10 hours through a lamp with rating of 1.0 ampere at 4.0 volts and is charged for 14 hours daily by means of a charger with output of 4.4 volts and 1.2 amperes at the beginning of charge and 5.1 volts and 0.09 amperes at the end of charge.

The gassing behavior during the charging period for such batteries in such a discharge-charge cycle is highly variable as indicated by the battery gassing measurements shown in Table I. This Table I is based on measurements taken during the charging portion of about one out of every three cycles following the number of previous conditioning cycles shown as noted below:

TABLE I

| Battery Number | 1 | 2 | 3 |
| --- | --- | --- | --- |
| Number of Conditioning Cycles Previous to Gassing Measurements | 0 | 176 | 265 |
| Number of Charges when Total Gas (Hydrogen plus Oxygen) Evolved per Cell Was Within Range of ml of: | | | |
| 200–300 | 2 | | |
| 300–400 | 5 | | |
| 400–500 | 8 | 8 | 5 |
| 500–600 | 6 | 10 | 1 |
| 600–700 | 3 | 7 | 1 |
| 700–800 | | 7 | 2 |
| 800–900 | | 6 | 1 |
| 900–1000 | | 3 | |
| 1000–1100 | 1 | 3 | |
| 1100–1200 | 1 | 2 | |
| 1200–1300 | | | |
| 1300–1400 | | | |
| 1400–1500 | | 5 | |
| 1500–1600 | | 3 | |
| Total (For 2 Cells) | 26 | 54 | 10 |

Figure 7:
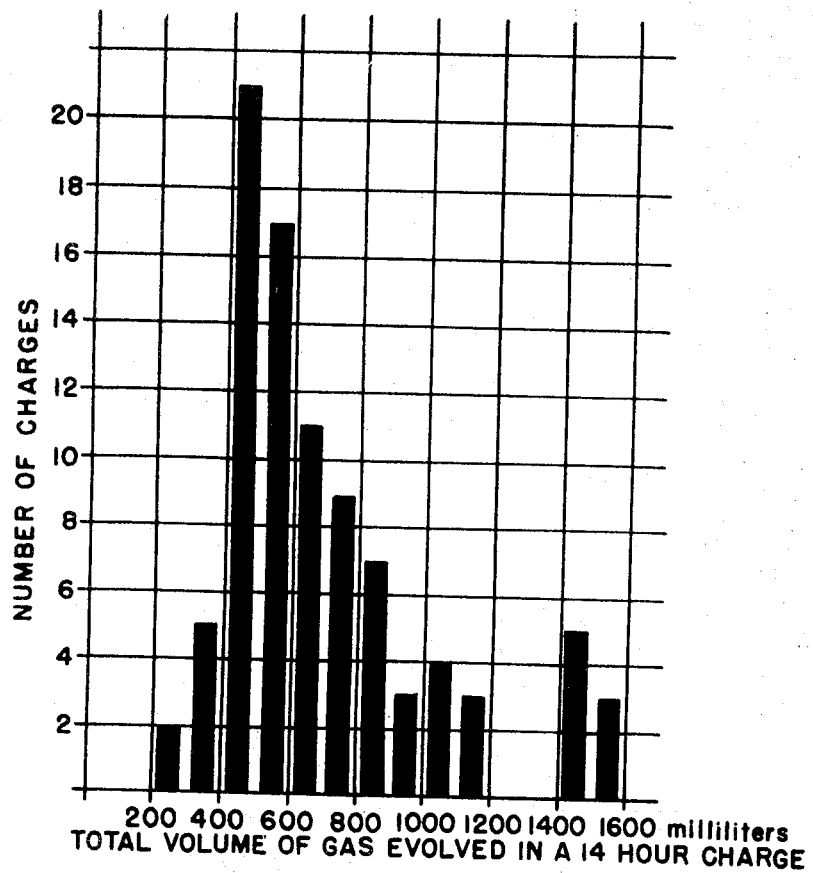
FIG. 7 is a diagrammatic view illustrating in chart form data on battery gassing.

As indicated by the data in Table I, the amount of gas evolved during charge is at least several times the gas space volume in each cell, which means that during a single charging period a pressure of at least several atmospheres would develop if the gases were confined within the cells and not recombined in any way. (Gas evolved during discharge has been found to average about 5 percent of the average amount evolved during charge.) The data also illustrate that the amount of gas evolved during a charging period may vary quite widely, from as little as 200 ml to as much as 1,600 ml per cell, though there is a concentration of data in the 400 to 600 ml range. The data for all three batteries considered together are presented in chart form in FIG. 7.

Not only do the typical miners' lamp batteries described above exhibit a wide range in total volume of gas evolved during each of a series of charging periods, but they also exhibit a wide range in the relative amounts of hydrogen and oxygen evolved during each of the series of charging periods as illustrated in Table 2 noted below. Table 2 shows the hydrogen/oxygen volume ratio for the same batteries and during most of the same charging periods represented by the data in Table I. The data for all three batteries considered together are presented in chart form in FIG. 8.

TABLE 2

| Battery Number | 1 each cell | 2 each cell | 3 each cell |
| --- | --- | --- | --- |
| Number of Charges When Hydrogen/Oxygen Ratio of Evolved Gas was Within Range of: | | | |
| .2–.6 | | 3 | |
| .6–1.0 | 6 | 2 | |
| 1.0–1.4 | 2 | 1 | |
| 1.4–1.8 | 6 | 8 | 6 |
| 1.8–2.2 | 10 | 9 | 2 |
| 2.2–2.6 | 1 | 4 | 1 |
| 2.6–3.0 | 1 | 2 | |
| 3.0–3.4 | | | |
| 3.4–3.8 | | 1 | 1 |
| 3.8–4.2 | | | |
| 4.2–4.6 | | 1 | |
| 4.6–5.0 | | | |
| 5.0–5.4 | | | |
| 5.4–5.8 | | | |
| 5.8–6.2 | 1 | | |

TABLE 2-Continued

| Battery Number | 1 each cell | 2 each cell | 3 each cell |
| --- | --- | --- | --- |
| Total | 26 | 32 | 10 |

The data in Table I and Table 2 demonstrate the wide variations in gassing volume and gas composition occurring in batteries regardless of age. The basic concept of the invention then is based on the discovery that by operating a conventional battery having non-stoichiometric gassing behavior, in a closed system, and by sealing it and essentially preventing the escape of gas, its long term behavior can be made to be stoichiometric. To take advantage of this discovery, and this is an important part of our invention, it is necessary to recombine as much of the gas evolved as possible by means of a suitable recombination device, that is, as much as possible of that amount in the gas space above the electrolyte which is capable of reacting (stoichiometrically) to form water and leaving only residual excess gas in the said space.

The apparatus shown in FIG. 1 is intended to illustrate diagrammatically one simple sealed system by means of which our basic long term stoichiometric recombination concept may be implemented. This battery system may be operated on discharge and periodically recharged in accordance with the method of the invention in the course of which evolution of hydrogen and oxygen takes place and the gases are confined during a number of charging cycles and are recombined by long term stoichiometric recombination. FIG. 1 also illustrates one simple pressure-recording means which is not essential in the method of operation but which can be conveniently utilized to observe battery conditions where this may be desirable.

Referring more in detail to the battery system illustrated in FIG. 1, this structure is intended to illustrate diagrammatically a sealed secondary battery of the lead-acid type which may be used in carrying out one part of the invention method, a battery charging apparatus of the class commonly utilized by miners in placing a battery on charge at the end of the working day and this charging apparatus is employed in carrying out a second part of the invention method. Numeral 204 indicates the battery charging means. The battery 202 is illustrated in further detail in FIGS. 2–5 inclusive and the charger 204 is also shown in FIG. 6.

In the apparatus indicated, means are provided for enabling an operator to use the battery on discharge and to change from a battery discharge operation to a battery charging operation in one simple way. For example, in placing the battery 202 on discharge, a circuit from the positive side of the battery 202 is completed through a lamp 206 and back to the negative side of the battery by moving the double throw switch poles 208 and 210 into contact with switch 212a and 214a, respectively. Current is then generated in the battery in the usual manner and energizes the lamp 206. Such a battery discharge operation is intended to be representative of daily use of the battery by a miner.

When the battery is to be recharged the battery is connected to charger 204. Switch poles 208 and 210 are then moved into contact with the battery charging switch contacts 212 and 214. This disconnects the lamp 206 and completes a circuit from the charger 204 through the battery 202 and charging then takes place. Such a battery charging operation is intended to be representative of a miner placing battery 202 in a charging rack 207 as suggested in FIG. 6. The battery during its charging operation evolves gases which are, in accordance with the invention, confined in the sealed battery 202 by suitable sealing means and which exert fluctuating pressures. These pressures acting through a transducer 218 may provide signals for actuating an electrical recording system 220 as indicated at the lower right hand side of FIG. 1, where arrangements for monitoring voltage and ampere during charge and discharge are also indicated.

Considering in greater detail this embodiment of battery arrangement generally indicated, attention is directed to FIGS. 2–5 inclusive. The battery 202, as shown therein, includes a body portion having suitable strangth characteristics for retaining pressures of approximately 75–80 p.s.i., and further provided with a sealed top 202a. In this body portion is a battery partition 230 which divides the battery into two cells.

Assuming that the battery is to have a rating comparable to the performance of the 4 volt miners' battery earlier described, the battery casing or body portion is constructed of a material having a strength which will withstand a predetermined range of pressures. For example, we may employ a polycarbonate plastic to provide the necessary strength. Polycarbonate plastics may be described as polymeric combinations of bifunctional phenols or bisphenols, linked together with a carbonate linkage.

In utilizing a plastic material such as polycarbonate we have, for example, determined that the battery may be constructed to contain a range of pressures extending from 0 pressure all the way up to as high as 75 to 80 p.s.i. In addition, the over-all size of the battery is regulated in accordance with the specific plate construction and quantity of electrolyte employed.

Contained in the cells referred to are positive plates 232, separator members 234, negative plates 236, electrolyte 238 and insulator means 240. The electrolyte is employed in an amount such as 210 mls to provide a liquid level which covers the tops of the plates. Immediately above the electrolyte are spaces A and B providing the specified volume of 300 mls in which gases evolved in the operation of the battery may be sealably contained. Conventional electrical conductor cables and terminals are provided as shown in FIG. 3.

While it is contemplated that for certain battery systems it may be desirable to provide a completely sealed gas space it is, in a preferred form of the invention, most desirable to employ a pressure relief valve which may be regulated in accordance with a predictable range of pressure fluctuations to provide for confining gas within predetermined releasable limits. The limits referred to are intended to fall below the maximum pressure retaining capabilities of the battery and may, for example, be of from 45 psig to 60 psig. A relief valve V, suitable for this purpose, may be mounted in the battery top in a position to communicate with the gas space shown in FIG. 3.

Also illustrated in FIGS. 2, 3, 4 and 5 is one suitable form of catalytic device which may be employed in recombining hydrogen and oxygen. As shown therein, the battery is formed with a partition 230, and extending through the partition 230 is a chamber assembly generally indicated by numeral 244 which comprises a housing for the catalytic device E of the invention. This housing 244, as best shown in FIG. 5, is formed with an upper chamber 246 in which is supported the catalytic device E. This catalytic device E includes a holder 248, occurring in spaced relation to the chamber body 244, together with a quantity of glass beads, indicated by numeral 250, supported between upper and lower retaining meshes 252. Disposed internally of the body of glass beads is pellet support structure 254 in which are received a plurality of pellets 256 which may, for example, consist of palladium coated alumina bodies having an amount of palladium of 0.5 percent by weight or less. The glass beads 250 act as protective and heat controlling means.

The housing 244 is formed with a pair of conduit portions 258 and 260 which extend downwardly and which are open at their lower ends in communication with the spaces A and B. The conduit portions are adapted to receive gases evolved and conduct them upwardly through a common passageway 262 which allows gases from both cells to rise upwardly toward the catalyst pellets. The catalyst E operates to recombine gases into water vapor. This water vapor rises by convection caused by heat from the catalyst and may condense on a conical inner surface 264 at the top of the catalyst chamber.

The conical surface 264 is constructed so that condensed water will not drip on the catalyst. However, as the water vapor cools, it becomes heavier and drops into the condensing chambers 266a and 266b. The resulting water passes through the condensed water passages 268a and 268b and on out to the respective cells through openings 270a and 270b. The conduit portions are further formed with cavities 272a, 272b which are arranged to collect drops of electrolyte in the event that any should enter when the battery becomes placed in an inverted position. Baffle members 274a and 274b are arranged in the common passageway 262 in a position such that they may stop droplets of water running onto the catalyst when the battery is inverted.

In operating the battery system described in accordance with the basic method of the invention the battery 202 is placed in use as by energizing a miners' lamp and discharge takes place. At the end of a working day the miner places the lamp on charge in the charging rack 207 as shown in FIG. 6. This cycle is repeated over a desired working life of the battery.

As illustrative of specific instances of operating and periodically recharging a sealed battery of the class having positive and negative members, such as battery plates in accordance with the basic method of invention, the following examples are cited:

EXAMPLE I

A 4-volt miners' battery having a suitable construction and size specifications as noted above was provided to contain 208 mls of electrolyte per cell and to form a sealed gas retaining space of a volume of approximately 300 mls. This space before being sealed was evacuated to 3 psi absolute and the pressure relief valve V set to release at 68 psig.

The battery was placed on discharge through a 1.0 ampere bulb for 10 hour periods and then recharged periodically for a 14 hour charge except that after every sixth discharge a charging period of 38 hours was employed simulating the usual weekend routine in mining use. The amount of gas evolved at any time in this period of successive discharge and charge cycles was monitored by means of measurement of internal pressure in the battery utilizing the pressure sensing means 218 and recording means 220 earlier described in connection with FIG. 1.

This sealed battery was cycled continuously over a 6-month period without difficulty and with gases being evolved and recombined in accordance with the long range stoichiometric recombination method of the invention.

FIG. 9 shows the range between minimum and maximum internal pressure and median pressure during each of the first 27 cycles of this battery. FIG. 10 shows the same kinds of data for this battery from its 79th to 112th cycles. During most of the period shown in FIG. 9, the pressure fluctuated within a range of 15 to 40 psig, though it reached the release pressure of 68 psig twice during the 19th and 22nd cycles. Total released gas during first 187 cycles was 5,300 ml, equivalent to 8.6 ml of water, or an average of 4.3 ml per cell, amounting to only about 2 percent of the total electrolyte volume. During the period of FIG. 10, the internal pressure did not approach the relief setting of 68 psig.

As one can clearly see in FIGS. 9 and 10, pressure excursions in a sealed battery according to our invention follow two patterns. One pattern is cyclicly repetitive, while the other is long term in character. In FIGS. 9 and 10 the pressure excursion for each cycle of the battery is shown, for simplicity, as a straight line between the maximum and minimum pressure during the cycle. The pressure changes during any given cycle is a reflection, mainly, of changes in the ratio of the evolution rates of hydrogen and oxygen during the cycle superimposed on the condition of residual gas composition and pressure which existed at the end of the previous cycle.

The difference in median pressure between successive cycles is an indication of the degree and direction of deviation from stoichiometrically balanced gassing during a cycle. Any increase in pressure median from one cycle to another indicates a cumulative hydrogen-oxygen ratio during the period such that a further accumulation of the residual gas in excess of stoichiometry at the beginning of the period resulted from the gases evolved during the period.

Conversely, a decrease in pressure median from one cycle to the next indicates a cumulative hydrogen-oxygen ratio during the period such that the gas evolved in excess of stoichiometry during the period is opposite in character (oxygen instead of hydrogen or vice versa) to the residual gas in excess of stoichiometry at the beginning of the period. By following the behavior of median pressure, one can observe the well-defined long term stoichiometric behavior of the battery.

In FIG. 9, for example, in the 24th cycle the median pressure returned approximately to that of the first cycle. In FIG. 10, long term stoichiometric balance is apparent over the 27 cycles from No. 79 to No. 106. Similar evidence of long term stoichiometric balance is presented in FIGS. 11, 12, 13 and 14 which relate to Examples III and IV as described below.

EXAMPLE II

Figure 12:
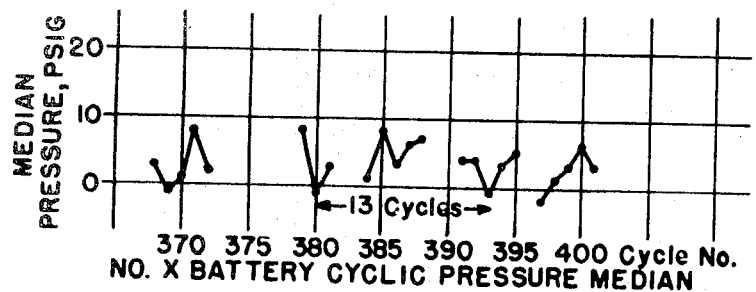

In FIGS. 11 and 12 the operation of another battery is indicated and this second battery was constructed generally similarly to the first battery except that the gas space was 150 mls. In this series of cycles illustrated, it will be observed that 46 cycles, from cycle 225 to cycle 271, were required for a complete excursion of median pressure from slightly below atmospheric pressure to values as high as 14 psi and back to slightly below atmospheric pressure again. For another series from cycle 380 to 393 only 13 cycles were required for a similar excursion. This battery operation again clearly established the occurrence of long term stoichiometric recombination in a pressure controlled environment extended over a period of nearly a year.

EXAMPLE III

Figure 13:
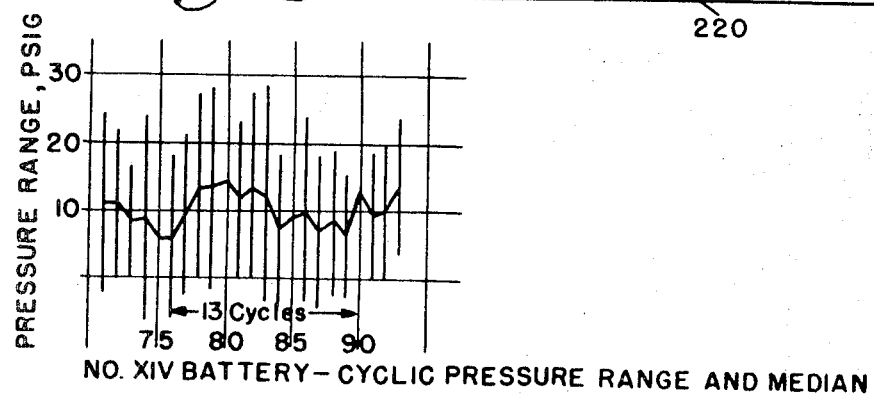

FIG. 13 illustrates a period of successful operation of still another battery of the same construction as the battery of Example I except that a different catalyst was used. During theseries of cycles shown the median pressure did not fall to 0 pressure. From cycle 76 to 89, however, there is an excursion of median pressure from 6 psig to as high as 14 psig before returning to 6 psig again. This also clearly substantiates long term stoichiometric recombination.

EXAMPLE IV

In FIG. 14 there is illustrated the behavior of still another sealed battery generally similar to those of the preceding Example during the first 34 cycles of operation. Three periods of long term stoichiometric recombination are indicated.

Various other sealed batteries have been similarly constructed, tested and operated with periodic recharging in a successful manner based upon the technique of a sealed pressure-controlled confinement of evolved gases. All of these batteries tested have indicated a common behavior pattern of long term stoichiometric gas recombination where periodic discharge and charge is carried out in a pressure controlled environment. This behavior pattern is consistently characterized by short term non-stoichiometric gassing producing maximum pressures which can be controlled or regulated in accordance with battery characteristics used. The behavior pattern also indicates that over a number of cycles, long term stoichiometric recombination occurs with sufficient frequency as to result in a range of pressures whose upper limits will usually be well below a practical pressure for setting a release valve.

While we have described our invention in reference to a so-called miners' battery, it is by no means restricted thereto and, as will be readily understood by those skilled in the art, is applicable to any secondary battery which evolves hydrogen and oxygen in non-stoichiometric behavior. This is a common feature of batteries of this kind, such as nickel-iron, nickel-cadmium and other commercial secondary batteries and batteries under development. While particularly in the case of relatively small secondary nickel-cadmium batteries, the problem of making maintenance free sealed batteries has been solved by other well-known means, this invention forms an alternative solution to the problem with particular advantages for larger size sealed nickel-cadmium cells which at present have been introduced to the market with moderate success only. The use of our invention with such batteries, for example, would allow the use of larger electrolyte volumes and a simplified charge control as the current-voltage relationship then is the same as in a vented battery of this type. Other applications of the invention may be in connection with batteries designed for other use patterns such as power tools, automotive batteries which are float-charged, standby batteries for telephone exchanges, electric traction batteries, or for portable appliances where trickle charging is frequently used.

Depending then on the specific design of any battery and its characteristic gassing and cycling behavior, the pressure control may be chosen to take optimum advantage of the present invention; namely, to essentially contain gases in excess over stoichiometric conditions of hydrogen or oxygen so that on continued cycling overall stoichiometry is established. Preferably, the maximum pressure contained within a battery will be fixed by having a relief valve, which will open at a predetermined pressure level and release some gas to maintain said maximum pressure in case gassing occasionally should exceed statistically established maximum levels. Such a release mechanism will permit a battery case design which will be safe for normal operating conditions at a pressure containment for essential achievement of long range stoichiometric behavior and lead, as shown in the Examples, to negligible water losses only. It is believed, however, that in some instances, higher pressures affect the rate of recombination of the gases.

Therefore, while maximum pressure containment is largely determined by practical battery case design limitations, we generally prefer, and find it satisfactory for practical purposes, to limit upper pressure levels to approximately 75 to 80 p.s.i. As to a preferable lower limit, this may depend on the start-up conditions. Frequently, we prefer to remove most of the air from the battery by starting up under vacuum conditions such as down to one-half cm mercury which frees the gas space from nitrogen as a diluent for the hydrogen and oxygen to be recombined.

Our basic method of recombination by resolving pressure is based on the use of the catalytic device E. We have also devised an improved method of controlling the rate of recombination in which we employ a novel catalytic device illustrated in FIGS. 15 and 16 and hereinafter described in detail.

Our improved method of controlling rate of recombination stems from a recognition of the fact that recombination of hydrogen and oxygen by means of a catalyst is an exothermic reaction which accelerates with the rate of gassing and/or partial pressures of stoichiometric hydrogen and oxygen to raise the temperature of the catalyst. The pressure contributed by a single gas to a gas mixture is generally referred to as its partial pressure. The exothermic reaction then is influenced by thepartial pressures of hydrogen and oxygen in stoichiometric ratio rather than the total pressure which may be additionally determined by nitrogen or excess hydrogen or oxygen over the amount of stoichiometric hydrogen/oxygen mixtures present. Thus it will be seen that change in catalyst temperature is a measure of the safety of the rate at which gases may be recombined by the catalyst without risk of explosion. However, rise in temperature of a catalyst is not only dependent on the heating value of the gases recombined, but also on the rate of heat dissipation from catalyst surfaces. Therefore, it is helpful to understand in detail reasons for change in catalyst temperature.

As has been earlier noted in the specification, there may develop during battery operation, for example, a hazard if for some reason the surface of a recombination device (be it thermal or catalytic) becomes inactivated by formation of a water film and it starts to dry. In such case, a small area of the active surface may suddenly be exposed to an atmosphere having high partial pressures of hydrogen and oxygen in stoichiometric ratio. Another hazardous condition may exist if the recombination surface, for example, due to short term heavy gassing, becomes over-heated and thermally ignites hydrogen-oxygen away from the surface causing conflagration and explosions.

While the conditions for ignition of hydrogen and oxygen mixtures are relatively well known, the quiescent recombination of these gases at a surface are far more complex. Whether the initiation of recombination is affected thermally by a hot surface or catalytically by an ambient temperature surface, the reaction must be initiated at or on the surface under conditions which will not cause the reaction to propagate thermally or by chain reaction initiated by free radicals if a quiescent type reaction rather than combustion or explosion is desired. The reaction of hydrogen and oxygen being highly exothermic as noted above requires a configuration which does not allow the reaction to proceed at a rate which would generate temperatures or free radicals in amounts which would uncontrollably propagate the reaction into the gas space of the battery.

In the case of catalytic reactions, at least, it is assumed with a high degree of certainty that the oxygen and hydrogen are first absorbed at the surface where they react to form water in the condensed form which then evaporates and frees the catalytic sites for further reaction. An example of a catalytic site is amorphous palladium metal on a catalyst support such as porous alumina. Dependent on the heat dissipation properties of the catalyst and its supporting structure, the temperature and nature of the environment, including importantly the partial hydrogen and oxygen pressure, etc., the heat generated by the exothermic reaction may then more or less raise the temperature of the catalytic surface to thereby raise its activity and generate more heat. If then there is an ample and rapid supply of hydrogen and oxygen present this can cause a run-away process which will lead to a thermally or free radical initiated ignition in the gas space away from the surface of the catalyst and result in combustion or explosion.

We have found that a recombination device for batteries evolving hydrogen and oxygen can be designed to give complete recombination at a satisfactorily rapid rate but within safe limits by controlling the reaction rate per unit area exposed to the gas in such a manner that within the design parameters of such a battery with respect to gas composition, pressure, and ambient temperature, the temperature as measured at that surface will not reach a value at which combustion or explosion proceeds into the gas space under the most adverse conditions prevailing within the gas space.

In this connection we have further determined a range of catalyst temperatures beyond which a safe rate of recombination cannot be carried out, and we find that this range includes temperatures lying within upper limits from about 400°C up to about 600°C. However, the corrosive nature of secondary batteries and the many rugged use conditions to which such batteries may be subjected have made the use of rubbers and plastics common practice, with hard rubber in recent practice being frequently replaced by synthetic resins such as polypropylenes, polycarbonates and acrylics, etc. While catalytic devices using ceramic enclosures have been designed, design freedom makes it frequently desirable to use plastic structures for their containment also.

We prefer, therefore, to design catalytic devices which are limited to an upper limit considerably below that desirable from a mere explosion hazard point of view so as to make them more reliable with plastic battery construction. The greater design freedom is particularly desirable for temperature limited catalytic devices since they need, as we have found, improved protection from electrolyte spray, such as acid spray. Since for modern high temperature plastics about 250°C is an upper limit for long term durability we prefer to limit the surface temperature of the catalytic materials to values at or below this temperature.

In thus controlling the rate of recombination to maintain catalyst temperatures so as not to exceed upper limits of from about 400°C to about 600°C, and in some cases in a range below 250°C, we find one preferred procedure is to limit the intrinsic capacity of the catalyst to recombine hydrogen and oxygen. In general, we find it is possible to catalytically recombine with limited consumption rate by adjusting the palladium content and palladium bearing surfaces in convective and/or radiant and conductive relationship with surrounding structure so that under the specific design consideration for any given battery the above safety limits will not be exceeded and preferably the temperature will be held below 250°C.

In substantiating our method of limiting consumption rate with adjusted palladium content, we may employ various test procedures which are found to be satisfactory as a practical means of determining the safety of any catalytic recombination device.

In one test procedure, we simulate the configuration of a battery gas space by a suitable sealed enclosure body and introduce into it a recombination device with an adjusted palladium content which can be evaluated for limited consumption rate catalysis.

For example, performance of a typical battery on charge may be simulated by electrolyzing water with suitable additions of acid, to form hydrogen and oxygen. The temperature of the catalytic device may be metered by either thermocouples or radiation pyrometer means. In this way, change in temperature of the recombination device with increase in rate of gas consumption may be readily observed as evolution of varying amounts of gases takes place. The enclosure body is also fitted with a pressure gauge and the pressure build up for any gassing rate can be noted and once the maximum recombination rate of any catalyst is reached any further increase in gassing rate will act as if the catalyst were not present.

In order to evaluate limited consumption rate of a catalytic device when subjected to the generally more hazardous condition of sudden activation in the presence of large amounts of hydrogen and oxygen, we may employ other test procedures. For example, in a second type of procedure, the catalytic device is subjected to sudden exposure to reactive gases at elevated pressures by pre-loading a chamber with one reactant gas at a predetermined pressure and then admitting a second reactant gas from another chamber at a different predetermined pressure.

This technique makes it possible to expose the catalytic device nearly instantly to pressures of combustible gas mixtures such as are encountered in a sealed battery operation. For most practical considerations, we have considered safe behavior up to four atmospheres as highly satisfactory. Safety of a catalytic device with an adjusted palladium content, as evaluated by this test, is clearly established if no explosion occurs at sudden pressures equivalent to the highest pressure for which the releasable pressure in any given battery is designed.

Based on results observed with catalytic devices of adjusted palladium content, it is found that the recombination capacity of the catalytic device may be reduced to a point where no appreciable recombination of gases takes place and no temperature change in the catalyst will occur as a result of recombination.

Utilizing the first test procedure noted with a conventional form of relatively high palladium content catalytic device such as, for example, a catalyst device in the form of a small cylindrical foraminous pellet having a diameter of 1.6 mm and an axial length of 3.8 mm and having an internal surface area of about 90 sq m/g and a palladium content of about 0.54 percent by weight, the catalyst was observed to become red hot and to rise in temperature to 600°C when subjected to gassing rates indicated by electrolyzing currents of about 2–3 amperes. It will be understood that gassing rate is the amount of stoichiometric hydrogen and oxygen evolved per unit of time when electrolyzing at a stated amperage.

The same test procedure was utilized with a catalytic device of reduced intrinsic capability of recombination. This relatively low palladium content catalyst was made in the form of a small cylindrical foraminous pellet having a diameter of four-sixteenths inch and an axial length of six-sixteenths inch. The pellet has a palladium content of about 0.01% Pd by weight and a surface area less than 1 sq m/g. When exposed to simulated gassing as described, the pellet recombined the gases at a substantially limited increase in rate of recombination and the catalyst reached a temperature of only about 200°C at a gassing rate of 3–4 amperes.

It was observed that the catalyst in this latter example was not capable of consuming much more than 4–5 amperes and since the pressure in the gas space increased, and thus the heat extraction increased, the temperature actually started to drop off at these high rates and the capability of consuming more gas ceased.

It has also been found that reducing the activity of the catalyst by limiting the intrinsic recombination capacity may lead to a tendency for the catalyst to be low or sluggish in initiating recombination reaction. However, this condition may be satisfactorily controlled in various ways as by applying heat to raise the temperature of the catalyst beforehand and various types of heating means may be employed for this purpose. For example, a catalyst was prepared by impregnating a foraminous alumina ring with 0.01 percent by weight palladium and capping the open ends of the ring with epoxy cement to reduce the catalyst surface exposed to reactive gas. The ring had an ID of about 4 mm, an OD of about 9 mm and a height of about 9 mm and an internal surface area of about 0.3 sq m/g. This catalyst was exposed to a sudden pressure of three atmospheres of stoichiometric hydrogen and oxygen without giving rise to any appreciable reaction within a thirty minute period.

When this same catalyst device was pre-heated to about 160°C and tested under the same conditions it reacted almost immediately on exposure to the reactable gases at a steady rate. In comparison a 0.5 percent by weight catalyst device of commercial quality comprising a cylinder 3 mm long and 3 mm in diameter and including a foraminous alumina support having an internal surface area of about 90 sq m/g reacted immediately even at one atmosphere pressure of stoichiometric hydrogen and oxygen. The reaction in this case led to explosions in some of the tests and the reaction resulted in the catalyst becoming red hot in all of the tests.

A way of defining activity is to define the amount of stoichiometric hydrogen and oxygen combined per gram of catalyst (catalyst metal and substrate) per minute at a given temperature. Thus, for the desired temperature ranges previously discussed activity can be defined in these terms. It must be realized, however, since the temperature is dependent on the environment that the empirical determination of palladium or equivalent range and the definition as given in the following are only crudely equivalent. Having this in mind we then can state that for the upper limit range of about 400°C to 600°C the consumption rate of stoichiometric hydrogen and oxygen would be about not more than 3–4 liters (or 9 to 10 $\times$ 10$^{-2}$ moles of water vapor generated) per hour per gram of catalyst or for about 250°C about 1.35 leters of stoichiometric gas (or about 3.7 $\times$ 10$^{-2}$ moles of water vapor generated) per hour per gram catalyst. The gassing rate of 1.35 liters per hour corresponds to about 2 ampere and 3.4 liters to about 5–6 ampere electrolyzing current.

Figure 15:
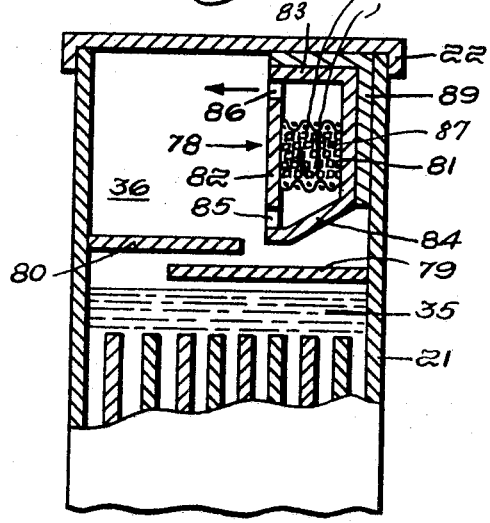
FIGS. 15 and 16 illustrate improved recombination means for use in controlling rate of recombination of gases at a catalyst surface.
Figure 16:
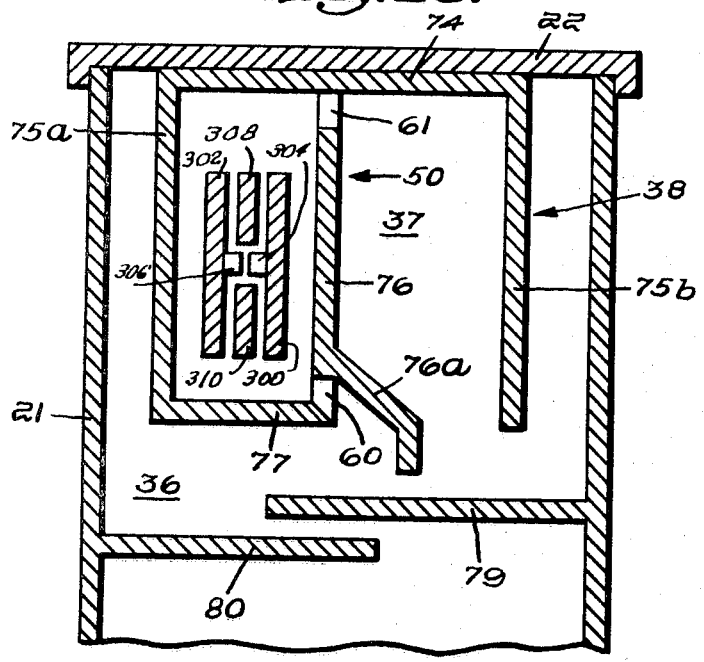

As illustrative of a specific example of controlling intrinsic recombination capacity of a catalyst in a sealed battery, attention is directed to FIGS. 15 and 16. For use in the battery of FIG. 15 we may provide pellets 81 having a controlled intrinsic recombining capability obtained by using in the pellets a catalytic material having an amount of 0.1 percent to 0.01 percent by weight or lower of palladium preferably on a foraminous substrate having an internal surface area of less than 1 sq m/g, since it was found that, in general, the ease of start-up for a low-level catalyst, that is one having less than 0.1 percent by weight palladium, is better the lower the surface area. Of course, if other catalyst metals or other catalysts for the combination of hydrogen and oxygen are used, such as the other noble metals or noble metal alloys or the like, equivalence can be easily tested in the above described simulating apparatus or under sudden exposure to stoichiometric hydrogen-oxygen mixtures under predetermined pressures as also described above.

By using a plurality of such low-level pellets as is shown in FIG. 15 a further degree of safety is achieved since the pellets tend to act in unison and since for a given battery gassing rate the consumption rate per unit surface of catalysts is even less and therefore the temperature will be even lower. Obviously, equivalent amounts of other catalysts can be used and the equivalency established by experiment as discussed elsewhere.

FIG. 15 illustrates a battery cell 21, having a cover 22 for sealably confining an electrolyte 35 having positive and negative plates contained therein. Baffle plates 79 and 80 extend above the electrolyte as shown. A protective enclosure body 78 is mounted against an inner wall of battery cell 21. The enclosure body 78 is formed with an inclined bottom 84 and a vertical wall 22 having an inlet 85 and an outlet 86.

In this form of the invention illustrated in FIG. 15 the pellets 91 may be contained, for example, on screens, in the protective enclosure body 84 between the gas inlet 85 and a gas outlet 86. With this relatively low-level form of catalytic material, we may provide heating means such as the heating element 87 and electrical heating wires 88 to aid specifically in initiating recombination when this is found to be required. In some cases when recombination has thus been initiated, further energizing with the electrical heating wires 88 may be discontinued.

In operation the battery of FIG. 15 with the catalyst means discussed reacted steadily at reduced rate of recombination with the temperature of the catalyst being held well below 250°C. With decreasing catalyst content of palladium and lower surface area of substrate, slow starting was experienced and this was satisfactorily aided by electrical heating of the catalyst.

In addition to adjusting the intrinsic recombination capacity of catalytic devices to control rate of recombination we find we may also obtain desirable control by limiting the flow of hydrogen and oxygen which comes into contact with catalytic surfaces. Since the catalyst surfaces are required to be protectively enclosed to avoid de-activation from contact with acid spray, it becomes practical to enclose or surround the catalyst with a protective body which is suitably designed to limit the flow of gases into contact with the catalyst surfaces and which may cooperate with a catalyst of a specific recombining capability to hold the temperature of the catalyst at values well below the temperature at which the gases can recombine explosively and specifically at values below upper limits of from about 400°C to about 600°C.

As illustrative of a means of controlling rate of recombination by limiting flow of hydrogen and oxygen coming into contact with catalytic surfaces, we may employ a flow-limiting device such as that shown in FIG. 16. FIG. 16 illustrates a battery cell similar to that of FIG. 15 including a cell body 21 and cover 22 from the underside of which is supported the protective enclosure body 50 having an inlet 60 and an outlet 61. The inlets are located in a vertical side 76 which terminates in a lower inclined part 76a. As shown in FIG. 16, we have provided side wall portions 300 and 302 on inner surfaces of which are adhesively secured the pellets 304 and 306. These pellets may be of high level activity such as the 0.5 percent by weight palladium pellets above-described. Located between the side walls of the flow-restricting device of FIG. 16 are spacer elements as 308 and 310, and these members may be adjustably supported to limit the flow of hydrogen and oxygen passing through and between the side walls 300 and 302.

By tests under sudden exposure to about three atmospheres we have determined that keeping the side walls 302 and 300 about one-sixteenth inch distant from spacer elements 308 and 310, and having the spacer elements extend about three-eighths inch on either side and the side walls about seven-eighths inch high, flow may be sufficiently restricted to prevent explosions.

In the arrangement illustrated the space around the catalyst pellets 304 and 306 can be maintained sufficiently small so that even if ignition occurs in this space the combustion or explosion will not propagate to the gas space surrounding the device as comprised by sidewalls 300 and 302 and spacers 308 and 310 in which catalyst pellets 304 and 306 are contained. Generally we have found that if volume around the catalysts is separated from an outer gas space by flow restrictions as suggested, and is held small enough then minor explosions occurring therein will not propagate through the flow restrictions and cause damage to the battery.

It will be understood that evaluation of a catalytic device may be carried out either by the test procedure indicated above or by actual operating conditions in a battery to be used and in which means are provided for measuring the temperature of the catalyst surfaces under the most adverse conditions. It will also be appreciated that requirements of safety and long life will vary with different kinds of battery uses. For example, batteries such as those used in emergency lighting are essentially stationary, while others such as certain power tools, for example, battery-driven power drills may be subjected to any possible orientation such as being completely inverted. Other batteries such as automotive and tractor batteries, while essentially used in one orientation, are subject to vibration and sometimes severe jolting.

It will be understood that we may desire to employ modified forms of the method of the invention. For example, we may desire to sense temperature changes in a catalyst and to vary the rate of flow of gases to the catalyst in accordance with the temperature changes, and in this connection, we may wish to employ temperature sensing means such as a thermocouple member connected to the catalyst body and a valve device for controlling the rate of flow in response to changes in the temperature sensing device. Various other changes and modifications may be resorted to.

We claim:

1. In a method of operating and periodically recharging a secondary battery system in a substantially maintenance-free condition throughout a number of battery discharging and recharging cycles extending over operating life of the battery, the steps which include containing positive and negative electrodes and a quantity of electrolyte in a sealed battery cell to define a closed gas space, evolving varying amounts of hydrogen and oxygen in the presence of catalyst means supported in a protective flue body which is located in the inner top of the battery cell above the electrolyte and the positive and negative electrodes and which is formed with inlet and outlet passageways for convective fluid flow, conducting the hydrogen and oxygen gases to the catalyst means in the protective flue body and into contact with catalyst surfaces of the catalyst means, said catalyst surfaces consisting in a foraminous substrate impregnated with a catalyst metal and in which the catalytic metal content is present in an amount occurring in a range of from 0.01 percent to 0.1 percent by weight of catalyst metal on the foraminous substrate, and the foraminous substrate having a surface area of not more than 1 square meter per gram, recombining exothermically stoichiometric quantities of hydrogen and oxygen which pass through the passageways and over the catalyst surfaces to provide a convective flow of water vapor away from the catalyst surfaces to condensing surface means communicating with the electrolyte, continuously maintaining exothermically heated catalyst surfaces within an upper limit range of from about 400°C up to about 600°C, and confining unreacted hydrogen and oxygen gases and uncondensed water vapor for long term stoichiometric recombination within a range of predetermined pressure variations of from less than 1 atmosphere up to 5 atmospheres in which residual gas representing deviation from stoichiometry of one component gas during some cycles in the operating life of the battery recombines with residual gas representing deviation from stoichiometry of the second component gas during other cycles in the operating life of the battery, thereby to maintain the water content of the battery substantially unchanged.

2. A method according to claim 1 in which the gases are recombined in the presence of recombination means consisting of a catalytic material having a gas recombining activity characteristic corresponding to no more than 3.36 liters of stoichiometric gas per gram of catalyst per hour at 400°C.

* * * * *